United States Patent [19]

Mir

[11] 4,377,753
[45] Mar. 22, 1983

[54] HIGH RESOLUTION OPTICAL-ADDRESSING DEVICE AND ELECTRONIC SCANNER AND/OR PRINTER APPARATUS EMPLOYING SUCH DEVICE

[75] Inventor: José M. Mir, Rochester, N.Y.

[73] Assignee: Eastman Kodak Company, Rochester, N.Y.

[21] Appl. No.: 268,977

[22] Filed: Jun. 1, 1981

[51] Int. Cl.³ .............................................. H01J 40/14
[52] U.S. Cl. .................................... 250/578; 250/216
[58] Field of Search ................. 250/578, 216; 350/374, 350/380

[56] References Cited

U.S. PATENT DOCUMENTS 4,348,593 9/1982 Seachman ........................... 250/578

*Primary Examiner*—David C. Nelms
*Assistant Examiner*—Darwin R. Hostetter
*Attorney, Agent, or Firm*—John D. Husser

[57] ABSTRACT

An optical-address device, useful e.g. in electronic imaging, features (i) a lens array including a plurality of discrete lens means, each adapted to focus incident collimated light, from a plurality of different incidence directions, onto respectively different pixel spots of its associated multi-spot address zone (of a multi-zone, optical-address region) and (ii) light directing structure for sequentially illuminating the lens array with collimated light of different incidence directions. Printer apparatus, scanner apparatus and scanner/printer apparatus incorporating such optical-address device are disclosed.

14 Claims, 10 Drawing Figures

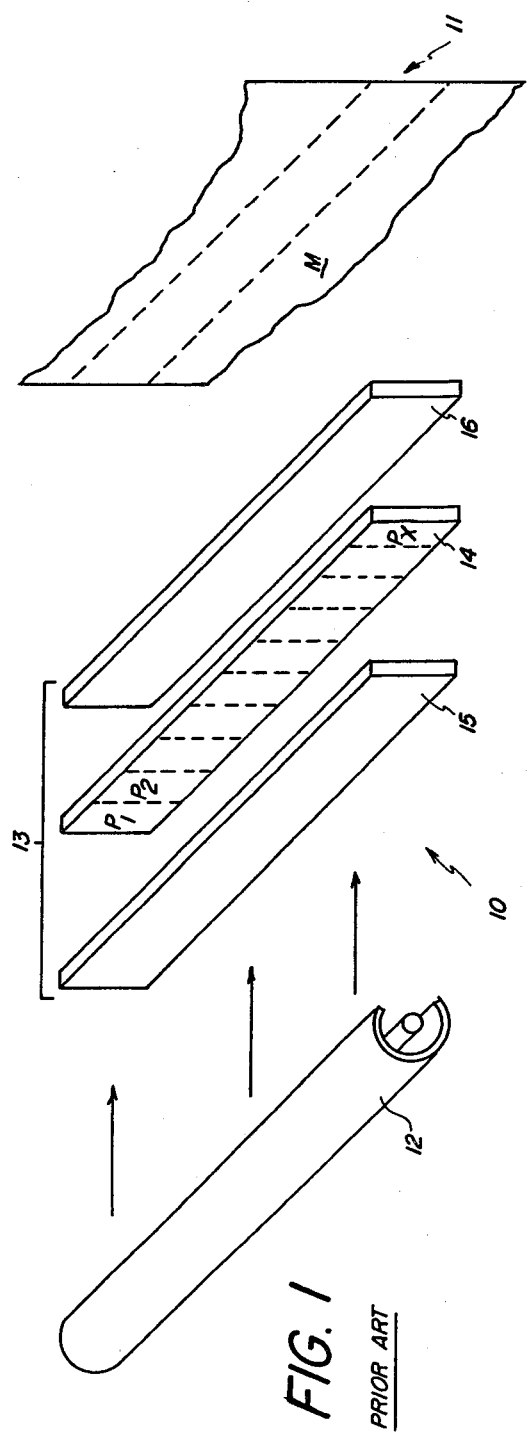
FIG. 1 _PRIOR ART_
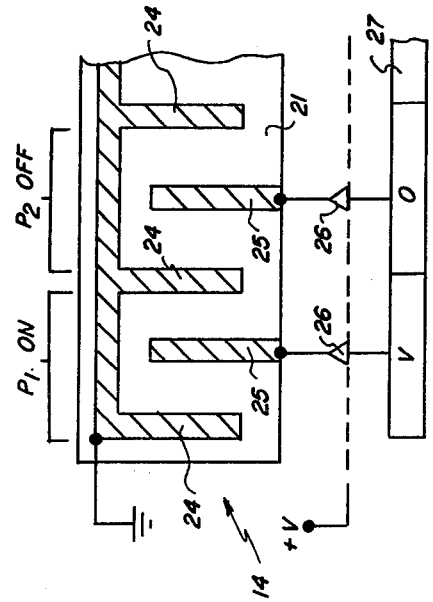
FIG. 2 _PRIOR ART_

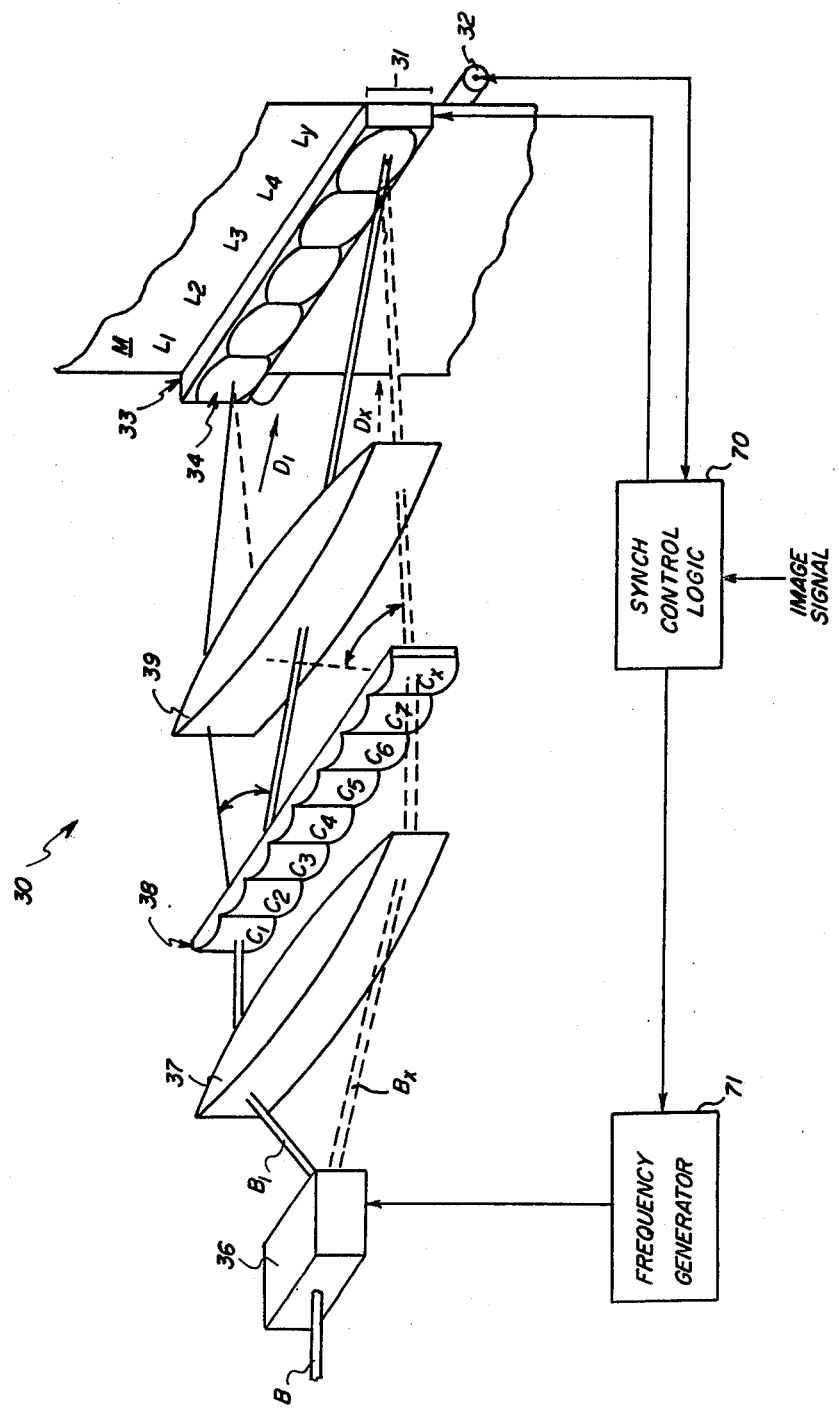

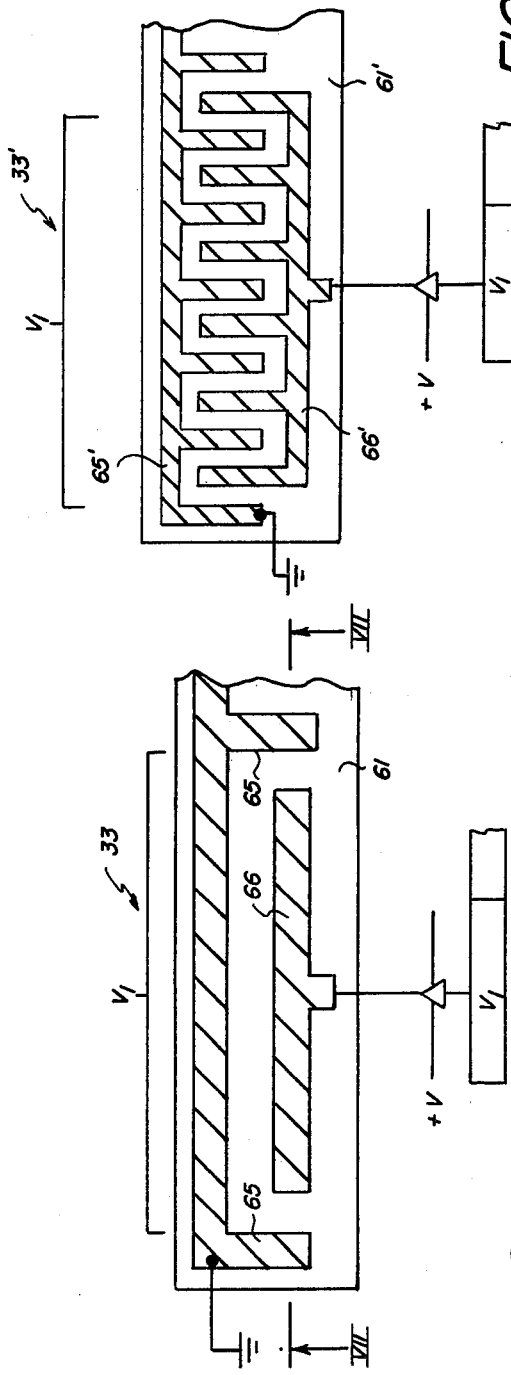
FIG. 6b
FIG. 6a
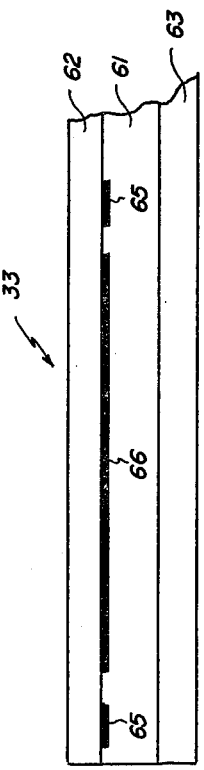
FIG. 7

HIGH RESOLUTION OPTICAL-ADDRESSING DEVICE AND ELECTRONIC SCANNER AND/OR PRINTER APPARATUS EMPLOYING SUCH DEVICE

CROSS-REFERENCE TO RELATED APPLICATIONS

Reference is made herein to U.S. application Ser. No. 268,975, entitled "Light Valve Devices and Electronic Imaging/Scan Apparatus which Locationally-Interlaced, Optical Addressing" filed June 1, 1981, in the name of J. M. Mir.

BACKGROUND OF THE INVENTION

1. Field of the Invention

The present invention relates to improvements in the high-resolution optical addressing of picture elements (pixels) and more specifically to a device for effecting such optical address and image scanning and/or printing apparatus employing such device.

2. Description of the Prior Art

Recently, it has been found that light valve array devices provide a highly useful vehicle in electronic imaging. One preferred light valve configuration comprises a piece of ferro-electric ceramic material, such as lanthanum-doped lead zirconate titanate (PLZT), which is sandwiched between crossed polarizers and electrically activatible to operate in a Kerr cell mode. An array of such light valves comprises such crossed polarizes and a panel of PLZT material that has a plurality of electrodes formed on one of its major surfaces. The electrodes are arranged in a manner facilitating the selective application of discrete electrical fields across (in a direction perpendicular to the direction of viewing) discrete surface areas which constitute pixel portions of the panel. Upon application of such fields, the PLZT material becomes birefringent and rotates the direction of polarization of incident light by an extent dependent on the field magnitude. This results in transmission of light through the PLZT pixels and cooperating polarizers varying as a function of the respective addressing fields.

My U.S. Pat. No. 4,229,095 discloses various embodiments of electronic color-imaging apparatus that utilize such light valve arrays to effect multicolor exposure of panchromatic recording media. For example, a color image is formed electronically by selectively opening and closing individual light valves of such arrays in synchronization with the energization of red, green and blue exposing sources and according to the red, green and blue color information for the pixels of that image. One preferred embodiment disclosed in that patent comprises a linear light valve array disposed in spaced transverse relation to the recording media feed path. The pixels of the array are addressed concurrently with image information, a line at a time, and the movement of the recording medium, and the red, green and blue color exposures are synchronized with successive actuations of the linear array.

It can be appreciated that light valves must address many image pixels per line in order to form images having even moderate detail. The number of pixels per line increases in accordance with the resolution requirements of the imaging application, e.g. becoming as large as 250 pixels per inch or larger for high quality continuous tone imaging. Each pixel of the recording medium must be independently addressable with light in accordance with the unique content of the image to be reproduced. Therefore, discretely activatible electrode means has been provided for each pixel portion of the light valve array, and each electrode means has had its own high voltage "off-on" switch, e.g. a transistor amplifier. The cost and complexity of these many switches and their connection and packaging present problems in electronic imaging with light valve devices.

One solution to minimize such problems is to provide a smaller number of transversely-spaced pixel portions in the light valve array and then effect multiple passes of the recording medium, with a transverse-indexing of the array (or recording medium) between passes. Thus, if light valve pixel portions are spaced with a three-pixel inter-space and the recording medium is transported past the light valve array four times, only one-fourth the usual number of high-voltage switches is required. However, multiple passes require additional time and can present registration problems.

Another solution, described in my U.S. application Ser. No. 268,975, entitled "Light Valve Devices and Electronic Imaging/Scan Apparatus with Locationally-Interlaced, Optical Addressing", filed June 1, 1981, employs cooperating high and low resolution light valve arrays to effect electronic imaging in an electronically efficient mode. This latter approach is highly advantageous for many applications; however, it is not highly light-efficient. In certain applications this can be a shortcoming.

SUMMARY OF THE INVENTION

It is one advantage of the present invention to provide a high-resolution, optical-addressing device which is useful, for example in light valve imaging, to afford improvements in both optical and electrical efficiency. In this regard, the present invention provides electronic imaging apparatus with a unique high-resolution optical address and cooperating low-resolution light-modulating structure. In another aspect the present invention provides such high-resolution optical address in image scanning apparatus. A further important aspect is to provide electronic scanner/printer apparatus having improved high-resolution optical-addressing configurations.

Thus the present invention, in one aspect, comprises an improved high-resolution, optical-addressing device having: (i) a linear lens array including a plurality of discrete lens means each adapted to focus incident collimated light, from a plurality of different incidence directions, onto respectively different pixel spots of its associated multi-spot address zone of a multi-zone optical-address region and (ii) control means for directing collimated light onto said linear lens array sequentially from different ones of a plurality of different incidence directions.

In the electronic imaging aspect of the invention, such optical-addressing device cooperates with a linear light valve array having a plurality of discrete, light-modulating portions which are each independently addressable electrically to control passage of light and optically aligned with a respective one of said discrete lens means of said linear lens array.

In the electronic scanning aspect of the invention, such optical-addressing device cooperates with a linear array of discrete photosensor elements, each located to receive light from a respective lens means of said linear lens array after transmission or reflection by a record member at a scanning region.

In yet another aspect, electronic scanning and imaging apparatus such as described above are provided in combination with said array of photosensor elements providing image information signals to said light valve array.

BRIEF DESCRIPTION OF THE DRAWINGS

The subsequent detailed description of preferred embodiments of the invention is made with reference to the attached drawings wherein:

FIGS. 1 and 2 are schematic illustrations of prior art light valve imaging apparatus;

FIG. 3 is a schematic and perspective view illustrating one preferred optical-addressing device and electronic imaging apparatus in accordance with the present invention;

FIGS. 6a and 7 are respectively plan and sectional views of a portion of the light valve array shown in FIGS. 3 and 4;

FIG. 6b is a plan view of an alternative light valve array useful in accordance with the present invention;

DETAILED DESCRIPTION OF THE PREFERRED EMBODIMENTS

Figure 4:
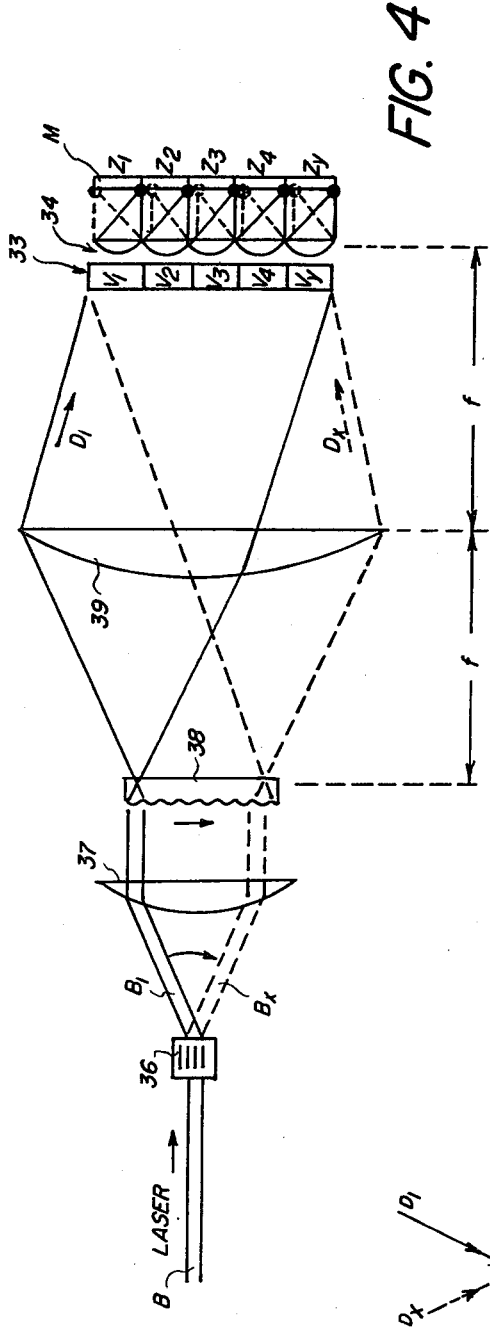
FIG. 4 is a diagrammatic top view of the device and apparatus shown in FIG. 3.

Referring first briefly to FIGS. 1 and 2, there is illustrated schematically a typical prior art light valve imaging apparatus 10. Thus, as light-sensitive recording medium M is moved past exposure station 11, light from source 12 is electro-optically modulated in an imagewise manner by light valve array 13. The array 13 comprises an electro-optic panel 14 (e.g. PLZT) sandwiched between crossed polarizers 15 and 16. The panel 14 comprises a plurality of separately-addressable light-modulating portions $P_1, P_2 \ldots P_x$, one for each pixel to be addressed at exposure station 11. As shown in FIG. 2, the discrete light-modulating portions of the panel are defined by grounding and addressing electrodes 24 and 25 respectively. Address means, e.g. shift register 27, provides image signals to high-voltage switches 26, thereby selectively applying high voltage $+V$ to the addressing electrodes in accordance with image information input to the shift register. Thus each pixel portion of the exposure zone requires its own electrode and switch structure.

Referring now to FIGS. 3 and 4, one embodiment of the present invention which is useful for electronic imaging in a more electrically efficient manner will be described. The electronic imaging apparatus 30 has a linear exposure region 31 and means 32 for transporting successive lines of recording medium M therepast. In general, the electronic imaging apparatus 30 comprises a low-resolution light valve array 33 and a device for optically addressing high-resolution pixels of the linear exposure region with light spots of correspondingly high resolution. The optical-addressing device, in general, includes: (1) a linear lens array 34 having a plurality of discrete spherical lens elements $L_1, L_2, L_3, L_4, L_y$, each adapted to focus incident collimated light, from a plurality of different incidence directions, onto respectively different spots within it associated multi-spot zone $Z_1, Z_2, Z_3, Z_4$ or $Z_y$, which form the linear exposure region 31; and (2) means for directing collimated light onto lens array 34 sequentially from a plurality of different incidence directions $D_1 \ldots D_x$. In the preferred embodiment shown in FIGS. 3 and 4, the means for so directing collimated light includes acoustooptic deflector 36, collimating lens 37, a linear array 38 of cylindrical lenticular elements $C_1-C_x$ and cylindrical or spherical collimating lens 39.

Figure 5:
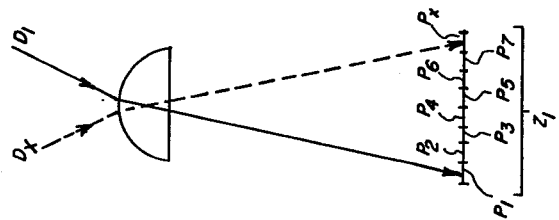
FIG. 5 is an enlarged diagram of a portion of the optical-addressing device shown in FIGS. 3 and 4.

The operation of the optical-addressing device can be better understood by referring to FIG. 5 together with FIGS. 3 and 4. Thus, deflector 36 is adapted to sequentially deflect an incoming circular light beam B, e.g. from a laser (not shown) along one of the directions $B_1-B_x$, each aimed at respective cylindrical elements $C_1-C_x$ of array 38. In the illustrated embodiment, cylindrical lens 37 is provided to direct the beams $B_1-B_x$ generally normal to the line of array 38. As shown in FIGS. 3 and 4, each of cylindrical elements $C_1-C_x$ refract its respective beam $B_1-B_x$ into a diverging sheet beam directed toward collimating lens 39 from a different direction. Collimating lens 39 refracts the expanded light from the cylindrical elements $C_1-C_x$ and directs it toward the lens array 34. More specifically lens 39, which can be, e.g., a spherical or cylindrical lens of focal length "f", is located one focal length f from array 38 and one focal length f from array 34. Thus it will be seen that the array 34 is sequentially illuminated with a plurality of collimated sheet beams, each from a different incidence direction in accordance with the initial deflection by modulator 36.

The advantageous result from this optical configuration and operational mode is that each lens element, $L_1-L_y$, focuses a different light spot for each of the different directions of incident collimated light. Thus during the sequence wherein beam B is deflected between $B_1-B_x$, array 31 is sequentially illuminated by collimated light from directions $D_1$ (solid line path in FIGS. 3-5) through $D_x$ (dotted line path in FIGS. 3-5). This causes sequential sets of focused light, each set including one spot in each multi-spot zone $Z_1-Z_1$ of the exposure region and each such spot corresponding to a pixel of the exposure region.

More specifically, when collimated light of direction $D_1$ (see FIG. 5) is incident on a lens array element, e.g. $L_1$, light is focused by the lens element to a spot $P_1$ within the multi-spot zone $Z_1$. A similar result is occurring concurrently at each of the other zones $Z_2-Z_y$. As deflector 36 shifts beam B to position $B_2$ (at element $C_2$), pixel $P_2$ of zone $Z_1$ is illuminated by lens $L_1$ (as are pixels $P_2$ of all other zones illuminated by lenses $L_2-L_y$). It will be appreciated therefore, that in the complete line exposure sequence, deflection from $B_1-B_x$, a total of x·y pixels of the exposure region are illuminated in sets, the number of sets corresponding to the number of directions $D_x$ (i.e. number of beam deflections $B_x$).

Now consider how the high-resolution optical-addressing device just described can be used in cooperation with low-resolution light valve array 33 to provide improved electronic imaging. One preferred configuration for the array 33 is illustrated in FIGS. 6 and 7. As shown, array 33 comprises an electro-optic panel 61 (e.g. (PLZT material) sandwiched between crossed polarizers 62,63. (An alternative electrode configuration is shown in FIG. 6b.) Grounded electrodes 65 define a plurality of discrete light-modulating portions $V_1$-$V_y$ which are each of low resolution, relative to pixel spots P, and which are each independently addressable via activating electrodes 66.

As shown best in FIG. 4, the low-resolution light valve array 33 is located with respect to lens array 34 so that each modulation portion $V_1$-$V_y$ is optically aligned to control light of corresponding lens elements $L_1$-$L_y$. Thus modulating portions $V_1$-$V_y$ respectively regulate the light for multi-spot zones $Z_1$-$Z_y$. As shown, each modulating portion $V_1$-$V_y$ has a single high-voltage switch 68 that is addressed by shift register 69 to control its energization with voltage +V. One further point should be explained at this stage. It will be noted that in FIG. 3 light valve array 33 is behind lens array 34 and the opposite is true in FIG. 4. The FIG. 4 arrangement is preferred to maximize the operative area of the light valve, which enhances uniformity.

One preferred mode of electronic imaging with apparatus 30 shown in FIG. 1, under the control of synchronization and control logic 70, is as follows. Synchronization and control logic 70 includes timing circuitry which regulates the movement of recording medium M past the exposure station to define line exposure periods for successive lines of recording medium M. During each such line exposure period, logic 70 actuates a plurality of sequential frequency shifts of frequency generator 71 to respectively effect deflection of beam B through each of its $B_1$-$B_x$ positions. This results in corresponding sequential optical address of pixels $P_1$-$P_x$ of each of multi-spot exposure zones $Z_1$-$Z_y$, during separate sub-periods of the line exposure period. That is, pixels $P_1$ of all zones ($P_1$ set) are optically addressed concurrently, pixels $P_2$ of all zones ($P_2$ set) are optically addressed concurrently, etc.

Figure 8:
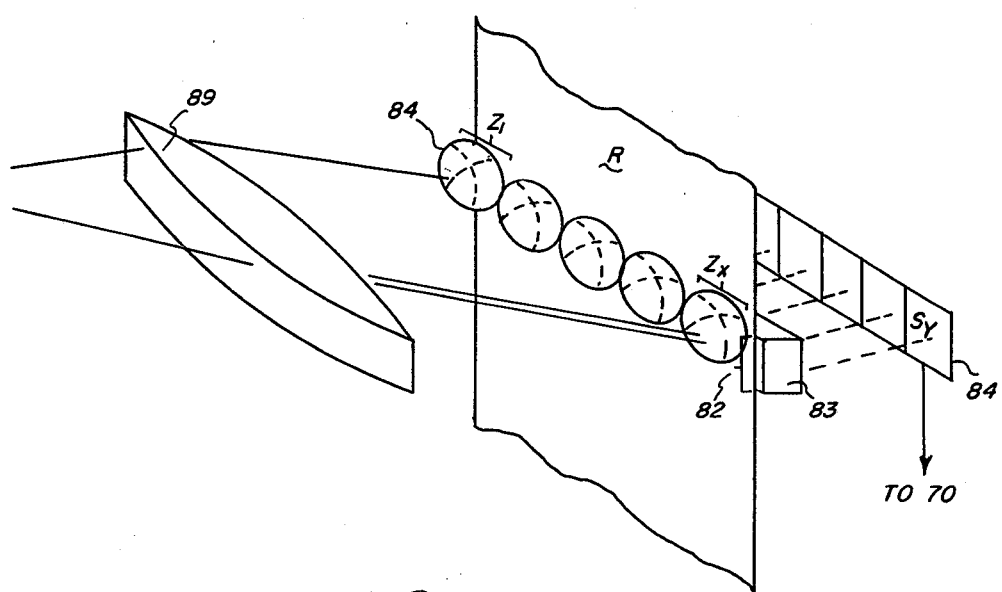
FIG. 8 is a schematic perspective view of a portion of one preferred scanning apparatus embodying the present invention.

During each such sub-exposure period the modulator portions $V_1$-$V_y$ of light valve array 33 are addressed with appropriate off-on information for the respective pixel sets ($P_1$ set through $P_x$ set), optically addressed during that sub-period. For example if pixel $P_3$ of zone $Z_1$ is to be exposed for a particular image line, the modulating portion $V_1$ will be energized during the $B_3$ sub-period of line exposure. It will be appreciated that the format of the image signal provided to array 33 is tailored in accordance with the number of lens element $L_y$ and the number of line sub-periods $B_x$. This can be accomplished by appropriate time delay and storage circuitry in logic unit 70, or more directly by scanning apparatus such as shown in FIG. 8. Also, gray scale can be obtained by activating pulse length modulation or modulation of the voltage amplitude of the activating pulse as described in more detail in U.S. Pat. No. 4,229,095.

The optical-addressing device of the electronic scanning apparatus 80 shown in FIG. 8 is identical to that shown in FIGS. 3 and 4. In fact, if the scanning apparatus 80 is used in cooperation with imaging apparatus 30, elements such as deflector 36 can be used commonly. Thus, during successive sub-periods of beam deflection $B_1$-$B_x$, collimated light is directed to lens array 84 at different directions from collimating lens 89. As a record member R, which is to be scanned, is moved past scan region 82, pixels $P_1$-$P_x$ of zones $Z_1$-$Z_y$ of the scan region are illuminated in sets as described above. In the illustrated embodiment the record member R is a transparency; thus optical-addressing light passes the record member in accord with information thereon. A lens array 83, e.g. of gradient index optical fibers, directs light from zones $Z_1$-$Z_y$ respectively to separate photosensor elements, $S_1$-$S_y$, of a low-resolution scan detector array 84. Thus it will be appreciated that the signals from elements $S_1$-$S_y$ of detector array 84 can be transmitted via logic 70 to light valve array 33 to control exposure of recording medium M. Alternatively such signals can be transmitted to a storage device for future processing or access.

Figure 9:
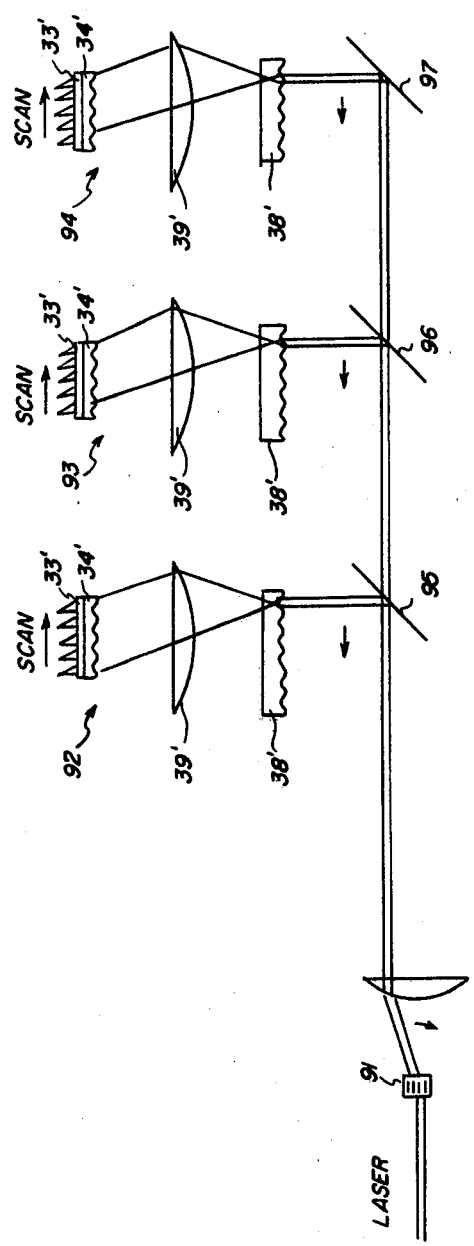
FIG. 9 is a schematic illustration of one multiple station color imaging apparatus in accord with the present invention.

One skilled in the art will appreciate that color imaging can be effected in accordance with the present invention by modifying the FIG. 1 apparatus to provide three colinear different color laser beams deflected by an acoustooptic means and by providing properly timed actuation of light valve array 33 during three successive color line exposure periods. In an alternative color imaging embodiment shown schematically in FIG. 9, three separate exposing stations (each containing elements 38', 39', 34' and 33') are located to discharge separate portions of a charged photoconductor web in accordance with the different color separation information for a particular image to be reproduced. Upon development of each such image with different color toner and registered transfer of the different images to a single transfer sheet, a multicolor image is produced. As shown in FIG. 9, such an embodiment comprises a single deflector 91 and separate exposure stations 92, 93, 94, each receiving light from deflector 91 via beam splitters 95, 96 and mirror 97 respectively.

Also, it should be understood that there are various alternative optical configurations for practice of the present invention. For example, in some applications it may be useful to construct array 38 as an array of higher lenslet periodicity than the number of illuminating directions, with the laser beam sequentially incident on different multi-lenslet groups (i.e. lenticule means). Further, beam scanning means other than acousto-optic deflectors, e.g. galvanometers or rotating polygon reflectors are useful for practice of the present invention.

The invention has been described in detail with particular reference to certain preferred embodiments thereof, but it will be understood that variations and modifications can be effected within the spirit and scope of the invention.

What is claimed is:

1. A device for optically addressing a plurality of discrete, high-resolution pixel spots located at respective positions across a linear, optical-address region, said device comprising:
   (a) a linear lens array including a plurality of discrete lens means each adapted to focus incident collimated light, from a plurality of different incidence directions, onto respectively different pixel spots of its associated, multi-spot address zone within said optical-address region; and
   (b) control means for directing collimated light onto said linear lens array sequentially from different ones of a plurality of different incidence directions, whereby different pixel spot sets, each including one pixel spot from each of the different zones of said optical-address region, will be optically addressed sequentially in response to such sequential light direction by said control means.

2. The invention defined in claim 1 wherein said control means comprises: (i) means for sequentially deflecting a generally circular light beam to different positions along a linear path, (ii) a linear lenticule array including a plurality of different lenticule means located at respective positions along said beam path, each of said lenticule means being adapted to refract such circular light beam into a sheet beam and (iii) collimating lens means, located between said lenticule array and said linear lens array, for collimating and directing sheet beams from said lenticule array onto said linear array.

3. The invention defined in claim 2 wherein said deflecting means includes an acoustooptic deflector adapted to deflect light to "x" different positions along said path, said lenticule array comprises "x" lenticule means and said lens array comprises "y" spherical lenslets, whereby x·y of said pixel spots will be optically addressed in "x" sets by deflection of said light beam to all of said "x" positions.

4. An electronic imaging apparatus having means for transporting successive linear regions of a light-sensitive image medium past a linear exposure region, said apparatus comprising:
  (a) a linear lens array including a plurality of discrete lens means each adapted to focus incident collimated light, from a plurality of different incidence directions, onto respectively different pixel spots of its associated, multi-spot exposure zone within said linear exposure region;
  (b) light control means for directing collimated light onto said linear lens array sequentially from different ones of a plurality of different incidence directions; and
  (c) a linear light valve array having a plurality of discrete light-modulating portions which are each independently addressable electrically to control the passage of light and optically aligned with a respective one of said discrete lens means.

5. The invention defined in claim 4 wherein said control means comprises: (i) means for sequentially deflecting a generally circular light beam to different positions along a linear path, (ii) a linear lenticule array including a plurality of discrete lenticules located at respective positions along said beam path, each of said lenticules being adapted to refract such circular light beam into a sheet beam and (iii) collimating lens means, located between said lenticule array and said linear lens array, for collimating and directing sheet beams from said lenticule array onto said linear lens array.

6. The invention defined in claim 5 wherein said deflecting means includes an acoustooptic deflector adapted to deflect light to "x" different positions along said path, said lenticule array comprises "x" cylindrical lenslets and said lens array comprises "y" spherical lenslets, whereby x·y of said pixel spots will be optically addressed by deflection of said light beam to all of said "x" positions.

7. The invention defined in claim 4 or 6 further further comprising (i) light valve control means for electrically addressing said light valve array portions in a plurality of successive address cycles and in accordance with image information for different respective pixel spot sets of a line of the image to be reproduced and (ii) means for synchronizing said light control means and said light valve control means.

8. The invention defined in claim 4 or 6 wherein during such sequential light directions by said light control means, light will be directed respectively to different pixel spot sets, each including one pixel spot from each of the different zones of said linear exposure region, and further comprising:
  (d) light valve control means for electrically addressing said light-modulating portions, in parallel, during a plurality of predetermined sub-periods of a line exposure period and in accordance with image information corresponding to respective pixel spot sets of the image line to be reproduced; and
  (e) means for synchronizing said light control means and said light valve control means so that said sub-period addressings of said light-modulating portions respectively coincide with said sequential light directions by said light control means.

9. Apparatus for optically scanning successive lines of a record member at a scanning region, said apparatus comprising:
  (a) means for transporting such member past a linear scan region;
  (b) a linear lens array including a plurality of discrete lens means each adapted to focus incident collimated light, from a plurality of different incidence directions, onto respectively different pixel spots of its associated, multi-spot scan zone within said scanning region;
  (c) control means for directing collimated light onto said linear lens array sequentially from different ones of a plurality of different incidence directions; and
  (d) a linear array of discrete photosensor elements each located to receive light from a respective lens means of said lens array after reflection or transmission by a record member line at said scanning region.

10. The invention defined in claim 9 wherein said control means comprises: (i) means for sequentially deflecting a generally circular light beam to different positions along a linear path, (ii) a linear lenticule array including a plurality of discrete lenticules located at respective positions along said beam path, each of said lenticules being adapted to refract such circular light beam into a sheet beam and (iii) collimating lens means, located between said lenticule array and said linear lens array, for collimating and directing sheet beams from said lenticule array onto said linear lens array.

11. The invention defined in claim 10 wherein said deflecting means includes an acoustooptic deflector adapted to deflect light to "x" different positions along said path, said lenticule array comprises "x" cylindrical lenslets and said lens array comprises "y" spherical lenslets, whereby x·y pixel sports will be scanned at said scanning region by deflection of said light beam to all of said "x" positions.

12. Electronic scanner printer apparatus having means for transporting successive lines of a recording medium past a linear exposure region and means for transporting successive lines of a record member to be reproduced past a linear scan station, said apparatus comprising:
  (a) first and second linear lens arrays each comprising a plurality of discrete lens means adapted to focus incident collimated light, from a plurality of different incidence directions, onto respectively different pixel spots of its associated, multi-spot exposure or scan zone within one of said exposure or scan regions;
  (b) control means for directing collimated light into said linear lens arrays sequentially from different ones of a plurality of different incidence directions;
  (c) a linear light valve array having a plurality of discrete light-modulating portions which are each independently addressable electrically to control the passage of light and optically aligned with a respective one of said discrete lens means of said first linear lens array; and (d) a linear array of discrete photosensor elements each located to receive light from a respective lens means of said second lens array after reflection or transmission by a record member line at said scanning region.

13. The invention defined in claim 12 further comprising means for electrically addressing said light valve array in a plurality of sub-line exposure periods and in accordance with image information from said photosensor array and means for synchronizing said light-directing control means and said electrically-addressing means.

14. The invention defined in claim 13 wherein said photosensor element array is electrically coupled to said light valve array.

UNITED STATES PATENT AND TRADEMARK OFFICE
CERTIFICATE OF CORRECTION

PATENT NO. : 4,377,753
DATED : March 22, 1983
INVENTOR(S) : Jose M. Mir

It is certified that error appears in the above—identified patent and that said Letters Patent is hereby corrected as shown below:

Column 7, line 53, delete "further", which shows up twice in the same sentence.

Column 8, line 46, delete "sports" and insert therefor --spots--

Signed and Sealed this

Twenty-first Day of June 1983

[SEAL]

Attest:

DONALD J. QUIGG

Attesting Officer

Acting Commissioner of Patents and Trademarks